United States Patent
Li et al.

(10) Patent No.: US 12,557,010 B2
(45) Date of Patent: Feb. 17, 2026

(54) NETWORK ACCESS METHOD, NETWORK DEVICE AND STORAGE MEDIUM

(71) Applicant: ZTE CORPORATION, Shenzhen (CN)

(72) Inventors: Fang Li, Shenzhen (CN); Kaiyue Song, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 322 days.

(21) Appl. No.: 18/564,833

(22) PCT Filed: Apr. 25, 2022

(86) PCT No.: PCT/CN2022/089077
§ 371 (c)(1),
(2) Date: Nov. 28, 2023

(87) PCT Pub. No.: WO2022/252879
PCT Pub. Date: Dec. 8, 2022

(65) Prior Publication Data
US 2024/0381235 A1    Nov. 14, 2024

(30) Foreign Application Priority Data
Jun. 1, 2021   (CN) .......................... 202110610981.1

(51) Int. Cl.
*H04W 48/18* (2009.01)
*H04W 28/08* (2023.01)

(52) U.S. Cl.
CPC ............ *H04W 48/18* (2013.01); *H04W 28/08* (2013.01)

(58) Field of Classification Search
CPC .................................................. H04W 48/18
See application file for complete search history.

(56) References Cited

U.S. PATENT DOCUMENTS

| 10,856,173 B2 | 12/2020 | Youn et al. |
| 2019/0357294 A1 | 11/2019 | Ha et al. |

(Continued)

FOREIGN PATENT DOCUMENTS

| CN | 103974335 A | 8/2014 |
| CN | 104254107 A | 12/2014 |

(Continued)

OTHER PUBLICATIONS

International Searching Authority. International Search Report and Written Opinion for PCT Application No. PCT/CN2022/089077 and English translation, mailed Jul. 25, 2022, pp. 1-10.

(Continued)

*Primary Examiner* — Curtis B Odom
(74) *Attorney, Agent, or Firm* — Vivacqua Crane, PLLC

(57) ABSTRACT

A network access method, a network device, and a storage medium are disclosed. The method may include: acquiring target network performance of an application; detecting whether the target network performance of the application matches a data steering mode included in an Access Traffic Steering, Switching and Splitting (ATSSS) rule delivered by a network side; in response to not matching, transmitting a target data steering mode corresponding to the target network performance to the network side, for a device on the network side to update the ATSSS rule according to the target data steering mode; and connecting, in response to receiving an ATSSS rule update success message sent by the device on the network side, the application to a network channel which satisfies the target network performance, where the network channel includes a 3GPP data transmission channel and/or a non-3GPP data transmission channel.

20 Claims, 3 Drawing Sheets

(56) References Cited

U.S. PATENT DOCUMENTS

2019/0373505 A1\* 12/2019 Jun ..................... H04W 80/10
2020/0412559 A1  12/2020 Tang et al.

FOREIGN PATENT DOCUMENTS

| CN | 105392149 A    | 3/2016  |
|----|----------------|---------|
| CN | 110832897 A    | 2/2020  |
| EP | 3182654 A1     | 6/2017  |
| KR | 20190132931 A  | 11/2019 |
| WO | 2020232404 A1  | 11/2020 |

OTHER PUBLICATIONS

European Patent Office. Extended European Search Report for EP Application No. 22814926.6, mailed Sep. 26, 2024, pp. 1-10.
Japan Patent Office. Notice of Reasons for Refusal for JP Application No. 2023-571426 and English translation, mailed Sep. 26, 2024, pp. 1-11.

\* cited by examiner

NETWORK ACCESS METHOD, NETWORK DEVICE AND STORAGE MEDIUM

CROSS-REFERENCE TO RELATED APPLICATION

This application is a national stage filing under 35 U.S.C. § 371 of international application number PCT/CN2022/089077, filed Apr. 25, 2022, which claims priority to Chinese patent application No. 202110610981.1 filed Jun. 1, 2021. The contents of these applications are incorporated herein by reference in their entirety.

TECHNICAL FIELD

Embodiments of the present disclosure relate to the field of communication, and in particular, to a network access method, a network device, and a storage medium.

BACKGROUND

With the development of communication technologies, the 5th Generation Mobile Communication Technology (5G) is also developing constantly. In terms of service characteristics, 5G faces demands for more diverse services and scenarios, higher user experience requirements, and lower latency and energy consumption. In terms of network operation, the 5G era is an era of coexistence of different networks. In the 5G era, 4G is still dominant in cellular networks, and a Wi-Fi technology continues to be updated. Therefore, 5G is inclusive and needs to consider integration of a plurality of access networks.

In the era of coexistence of different networks, a user may set an access network for an application of a terminal, such as Wi-Fi connection only, cellular network connection only, Wi-Fi connection priority, cellular network connection priority, or the like.

However, P the above technologies only provide some types of access networks on the terminal. During data transmission, requirements of most applications for the data transmission do not depend on a type of an access network, but on performance of the access network. For example, APP 1 requires transmission of data over a high-speed network, and APP 2 requires transmission of data over a low-latency network. The user cannot know the characteristics of the access network when setting. Therefore, the above technologies often cannot meet the requirement of the application for the network performance.

SUMMARY

Embodiments of the present disclosure provide a network access method. The method may include: acquiring target network performance of an application; detecting whether the target network performance of the application matches a data steering mode included in an Access Traffic Steering, Switching and Splitting (ATSSS) rule delivered by a network side; in response to not matching, transmitting a target data steering mode corresponding to the target network performance to the network side, for a device on the network side to update the ATSSS rule according to the target data steering mode; and connecting, in response to receiving an ATSSS rule update success message sent by the device on the network side, the application to a network channel which satisfies the target network performance, where the network channel includes a 3GPP data transmission channel and/or a non-3GPP data transmission channel.

Embodiments of the present disclosure further provide a network access method. The method may include: sending, in response to receiving a target data steering mode sent by a terminal, an ATSSS rule update success message to the terminal after update of an ATSSS rule, for the terminal to connect the application to a network channel which satisfies target network performance; where the target data steering mode is a data steering mode corresponding to the target network performance of the application, the update of the ATSSS rule is based on the target data steering mode, and the network channel includes a 3GPP data transmission channel and/or a non-3GPP data transmission channel.

Embodiments of the present disclosure further provide a network device. The device may include: at least one processor; and a memory in communication connection with the at least one processor; where the memory stores an instruction executable by the at least one processor which, when executed by the at least one processor, causes the at least one processor to implement the above network access method.

Embodiments of the present disclosure further provide a computer-readable storage medium, storing a computer program which, when executed by a processor, causes the processor to implement the above network access method.

BRIEF DESCRIPTION OF DRAWINGS

One or more embodiments are illustrated by figures in the corresponding drawings, and these illustrations do not constitute limitations on the embodiments.

DETAILED DESCRIPTION

Figure 1:
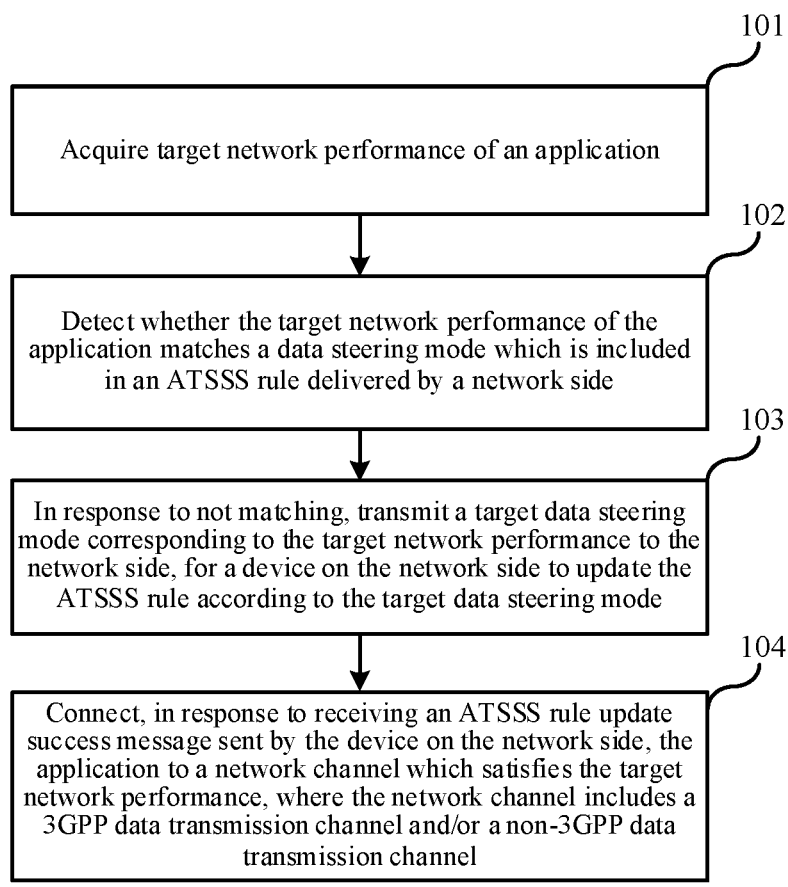
FIG. 1 is a flowchart of a network access method applied to a terminal according to an embodiment of the present disclosure.

In order to make the objectives, technical schemes, and advantages of the present disclosure clear, embodiments of the present disclosure will be described in detail below in conjunction with the accompanying drawings. However, those having ordinary skills in the art may readily appreciate that many technical details are provided in the embodiments of the present disclosure to enable readers to better understand the present disclosure. However, even without those details and various changes and modifications based on the following embodiments, the technical scheme of the present disclosure can still be achieved. Division of the following embodiments is merely for convenience of description and shall not constitute any limitation on specific implementations of the present disclosure. The embodiments may be combined with each other and referenced to each other if not in collision.

Embodiments of the present disclosure provide a network access method, which can meet different requirements of applications of a terminal for network performance and connect the applications to networks with different network performance.

Embodiments of the present disclosure provide a network access method, which is applied to a terminal device supporting a 5G ATSSS technology. The terminal device can interact with a network side, such as a mobile phone or a tablet computer, which is not limited in this embodiment. The network access method in this embodiment includes: acquiring target network performance of an application; detecting whether the target network performance of the application matches a data steering mode included in an ATSSS rule delivered by a network side; if not, transmitting a target data steering mode corresponding to the target network performance to the network side, for a device on the network side to update the ATSSS rule according to the target data steering mode; and connecting, if an ATSSS rule update success message sent by the device on the network side is received, the application to a network channel which satisfies the target network performance, where the network channel includes a 3GPP data transmission channel and/or a non-3GPP data transmission channel.

In this embodiment, the terminal interworks with the network side, and transmits the target network performance of the application to the network side in the form of a data steering mode, for the network side to update the ATSSS rule. On the one hand, it is convenient for the network side to schedule uplink and downlink data according to the updated ATSSS rule. The updated ATSSS rule reflects a requirement of the application for network performance. Therefore, applications of the terminal in this embodiment can be connected to respective network channels satisfying the corresponding target network performance. On the other hand, the terminal interacts with the network side with respect to the settings, preventing losses and confusion of data packets caused by differences between the access network set on the terminal and a preset ATSSS rule on the network side.

Referring to FIG. 1, implementation details of the network access method in this embodiment are described below. The following content is merely implementation details provided for ease of understanding and is not necessary to implement this scheme.

Before performing network communication, the terminal needs to register with a 5G network first. After registration, the terminal initiates a Multi-Access Protocol Data Unit (MA PDU) session, reports an ATSSS capability, and receives an ATSSS rule table delivered by the network side. The ATSSS rule table includes a plurality of ATSSS rules. An ATSSS function is mainly used for path optimization, seamless switching, multi-path concurrency, and the like of a Multi-Access (MA) service of the terminal, which is a function introduced in a 3GPP R16 version.

In a step of 101, target network performance of an application is acquired. The target network performance is a service characteristic mode of the application set on the terminal, which indicates a requirement of the application for network performance, such as a high-speed mode, a low-latency mode, a low-power mode, a safer mode, or the like, which is not limited in this embodiment.

In some embodiments, the target network performance is determined based on a code logic of the terminal, that is, through default target network performance preset in the terminal. For example, the requirement of the application for network performance is fixed in code. As indicated by the code, target network requirement of APP 1 is the high-speed mode.

In some other embodiments, the terminal provides a human-computer interaction interface, and the target network performance of the application input by a user is acquired through the human-computer interaction interface. In this embodiment, the terminal may detect whether the target network performance in the human-computer interaction interface has been updated. If yes, the terminal acquires the target network performance input by the user, and if not, the terminal continues monitoring, such that the terminal can adjust network access in real time based on a requirement of the user.

For example, the user may input the high-speed mode through a user interface, and the terminal device acquires the high-speed mode. Compared with the situation where the target network performance is determined by the terminal according to its own code logic, in this embodiment, different data transmission requirements of the user can be met, and ATSSS rules are customized according to different user requirements for data transmission, which brings better network experience to the user.

For example, the target network performance of the application includes a high-speed mode, a low-latency mode, a low-power mode, and a safer mode. Settings of target network performance corresponding to applications can be seen in Table 1.

TABLE 1

| Target network performance | APP ID |
| --- | --- |
| High-speed mode | APP 1 |
| Low-latency mode | APP 2 |
| Low-power mode | APP 3 and APP 5 |
| Safer mode | APP 4 and APP 6 |

In Table 1, in the mode of each target network performance, the user may add or delete an application according to his/her own requirement.

In a step of 102, it is detected whether the target network performance of the application matches a data steering mode included in an ATSSS rule delivered by a network side.

The ATSSS rule includes a data steering mode. The data steering mode includes: Load balancing, Smallest delay, Active-standby, Priority based, and so on. The data steering mode may be used for selective access of data flow, switching of data flow, and shunting of data flow.

In some embodiments, it is detected whether a data steering mode corresponding to the application exists in the ATSSS rule delivered by the network side. If the data steering mode corresponding to the application does not exist, the target network performance does not match the data steering mode. For example, if target network performance of APP 1 on the network side is the high-speed mode and the ATSSS rule delivered by the network side does not indicate a data steering mode of APP 1, the target network performance does not match the data steering mode. If the ATSSS rule delivered by the network side indicates the data steering mode of the application and the indicated data steering mode of the application corresponds to the set target network performance of the application, a mapping rule is satisfied. The mapping rule is shown in Table 2. For example, if the target network performance of APP 1 is the high-speed mode and the data steering mode of APP 1 in the ATSSS rule delivered is Load balancing, the high-speed mode corresponds to Load balancing, and the target network performance matches the data steering mode. If the data steering mode of APP 1 in the ATSSS rule delivered is Smallest delay, the high-speed mode does not correspond to Smallest delay, and the target network performance does not match the data steering mode.

A preset mapping rule of network performances and data steering modes can be seen in Table 2. In Table 2, the network performance of high-speed mode may be mapped to the data steering mode of Load balancing, the low-latency mode may be mapped to the steering mode of Smallest delay, the low-power mode may be mapped to the steering mode of Active-standby, the safer mode may be mapped to the steering mode of Priority based, and it is specified that a 3GPP network channel has high priority and is accessed first. The above mapping relationship is merely an example, which may be set as required during an actual application, and is not limited in this embodiment.

TABLE 2

| Network performance | Data steering mode |
| --- | --- |
| High-speed mode | Loading balancing |
| Low-latency mode | Smallest delay |
| Low-power mode | Active-standby |
| Safer mode | Priority based, 3GPP is high priority access |

In some embodiments, an ATSSS rule is generated based on a preset mapping rule of network performances and data steering modes. The generated ATSSS rule includes: the target data steering mode, and it is detected whether the generated ATSSS rule is the same as the ATSSS rule delivered by the network side. In this embodiment, in order to be better compatible with a 3GPP protocol, the ATSSS rule is generated based on the preset mapping rule.

The terminal generates an ATSSS rule according to the above preset mapping rule and the target network performance. The ATSSS rule includes the target data steering mode and may further include a traffic descriptor. The traffic descriptor in this embodiment may be an application identification (APP ID). For example, referring to Table 3, target network performance of APP 1 is the high-speed mode, and content of a generated ATSSS rule 1 includes: APP 1, Load balancing; target network performance of APP 2 is the low-latency mode, and content of a generated ATSSS rule 2 includes: APP 2, Smallest delay; target network performance of APP 3 is low-power mode mapping, and content of a generated ATSSS rule 3 includes: APP 3, Active-standby; and target network performance of APP 4 is the safer mode, and content of a generated ATSSS rule 4 includes: APP 4, Priority based, 3GPP is high priority access.

TABLE 3

| Target network performance | App ID | ATSSS rule mapping |
| --- | --- | --- |
| High-speed mode | APP 1 | ATSSS rule: APP 1, load balancing |
| Low-latency mode | APP 2 | ATSSS rule: APP 2, Smallest delay |
| Low-power mode | APP 3 | ATSSS rule: APP 3, Active-standby |
| Safer mode | APP 4 | ATSSS rule: APP 4, Priority based, 3GPP is high priority access |

If the user wants to delete an application, the data steering mode corresponding to the APP corresponding to the deleted application may be a match-all type, for example, ATSSS rule 5: APP, match all type.

The generated ATSSS rule is compared with an ATSSS rule delivered by the network side when an MA PDU session is established. If the generated ATSSS rule is the same as the ATSSS rule delivered by the network side, no processing is performed, and if the generated ATSSS rule is different from the ATSSS rule delivered by the network side, step 103 is performed. For example, if the data steering mode of APP 2 in the delivered ATSSS rule table and the data steering mode of APP 2 in the generated ATSSS rule are both Smallest delay, the two are identical and no processing is performed. If the data steering mode of APP 2 in the delivered ATSSS rule table is Smallest delay and the data steering mode of APP 2 in the generated ATSSS rule is Load balancing, the two are different, that is, the target network performance does not match the preset data steering mode on the network side, and step 103 is performed.

In the step of 103, if the target network performance does not match the preset data steering mode on the network side, a target data steering mode corresponding to the target network performance is transmitted to the network side, for a device on the network side to update the ATSSS rule according to the target data steering mode.

In some embodiments, the target data steering mode corresponding to the target network performance is transmitted to the network side through a user plane protocol. There are a large number of terminals in the network, each terminal has multiple applications installed, and each application has its corresponding network requirement. In consideration of this, when the data steering mode needs to be transmitted, the amount of data is huge. Therefore, in this embodiment, data is transmitted through the user plane protocol, for the device on the network side to update the ATSSS rule, which can prevent serious signaling storms caused by transmission through air interface signaling. The user plane protocol in this embodiment may be used by the terminal to transmit information to the network side. The user plane protocol may be Hypertext Transfer Protocol Secure (HTTPS), a Transmission Control Protocol (TCP)/User Datagram Protocol (UDP), a Hypertext Transfer Protocol (HTTP), or the like, which is not limited in this embodiment.

In an example, the user plane protocol is the HTTP, the generated ATSSS rule may be encapsulated into UEApp-CongurationUpdate information. The UEAppConguration-Update information is carried in an http request message, and the http request message is sent to the network side. The device on the network side updates the ATSSS rule according to the ATSSS rule including the target data steering mode.

In a step of 104, if an ATSSS rule update success message sent by the device on the network side is received, the application is connected to a network channel which satisfies the target network performance, where the network channel is a 3GPP network channel and/or a non-3GPP network channel.

In some embodiments, the ATSSS rule update success message sent by the device on the network side is received through the user plane protocol.

For example, a 200 OK message sent by the network side is received, prompting the user that the setting is successful, that is, the ATSSS rule is updated successfully. The network side and the terminal may follow the updated ATSSS rule, such as ATSSS rule (UE 1: ATSSS rule 1 (APP 2, Load balancing)) and follow a standard protocol process to be connected to the network channel which satisfies the target network performance and transmit data.

In this embodiment, the terminal interworks with the network side. The terminal transmits the target network performance of the application to the network side in the form of a data steering mode, for the network side to update the ATSSS rule. On the one hand, it is convenient for the network side to schedule uplink and downlink data according to the updated ATSSS rule. The updated ATSSS rule reflects a requirement of the application for network performance. Therefore, applications of the terminal in this embodiment can be connected to respective network channels satisfying the corresponding target network performance. On the other hand, the terminal interacts with the network side with respect to the settings, preventing losses and confusion of data packets caused by differences between the access network set on the terminal and a preset ATSSS rule on the network side.

Another embodiment of the present disclosure provides a network access method, applied to a device on a network side, such as a server, but there is no limitation thereto. The network access method in this embodiment includes: if a target data steering mode sent by a terminal is received, sending an ATSSS rule update success message to the terminal after update of an ATSSS rule is completed, for the terminal to connect the application to a network channel which satisfies target network performance, where the target data steering mode is a data steering mode corresponding to the target network performance of the application, the update of the ATSSS rule is based on the target data steering mode, and the network channel includes a 3GPP data transmission channel and/or a non-3GPP data transmission channel.

In this embodiment, the target data steering mode of the terminal can be received. The target data steering mode is a data steering mode corresponding to the target network performance of the application. The ATSSS rule table is updated accordingly. On the one hand, the network side, when scheduling uplink and downlink data through the updated ATSSS rule table, can meet the requirement of the application in the terminal for network performance. On the other hand, consistency between settings of the terminal and the preset ATSSS rule on the network side is ensured, preventing loss and confusion of data packets caused by inconsistency between the preset ATSSS rule on the network side and the user's local settings.

Figure 2:
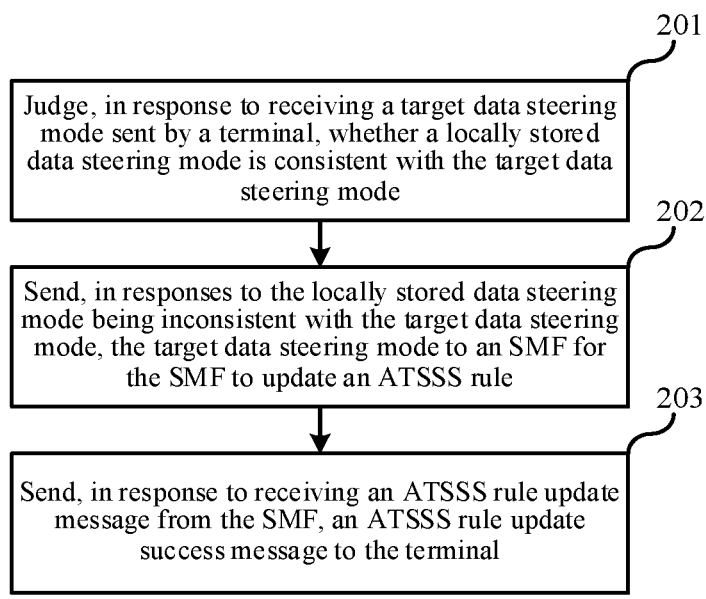
FIG. 2 is a flowchart of a network access method applied to a device on a network side according to an embodiment of the present disclosure.

Referring to FIG. 2, implementation details of the network access method in this embodiment are described below. The following content is merely implementation details provided for ease of understanding and is not necessary to implement this scheme.

In a step of 201, if a target data steering mode sent by a terminal is received, it is judged whether a locally stored data steering mode is consistent with the target data steering mode. A data steering mode corresponding to the same terminal and application as the target data steering mode is taken out of the locally stored data steering modes for comparison. For example, if the target data steering mode is a data steering mode of APP 1 of Terminal 1, a locally stored data steering mode of APP 1 of Terminal 1 is selected for comparison. Compared with directly sending the target data steering mode to a Session Management Function, in this embodiment, the device on the network side first judges whether settings of the terminal are consistent with an ATSSS rule being used on the network side and then determines whether to perform transmission, so as to ensure transmission of the updated target data steering mode to the Session Management Function and prevent transmission of non-updated data to the Session Management Function.

In some embodiments, the device on the network side receives the ATSSS rule sent by the terminal, and the ATSSS rule includes the target data steering mode.

In some embodiments, the device on the network side is configured with a User Application Configuration Function (UACF), that is, a UACF network element. The UACF network element is configured to store the ATSSS rule including the target data steering mode sent by each terminal and to determine whether the ATSSS rule needs to be sent to the Session Management Function (UACF), that is, the UACF network element.

In an example, the UACF network element detects whether a received http request message includes UEApp-CongurationUpdate information, and if yes, the UEAppCongurationUpdate information is parsed to obtain an ATSSS rule which is stored locally. A storage format of the ATSSS rule is as follows:

{UE 1: ATSSS rule 1 (APP 1, Smallest delay; APP 2, Smallest delay)}

{UE 2: ATSSS rule 1 (APP 1, Active-standby; APP 2, APP 4, Priority based, 3GPP is high priority access)}.

In a step of 202, if the locally stored data steering mode is inconsistent with the target data steering mode, the target data steering mode is sent to the Session Management Function for the Session Management Function to update the ATSSS rule.

In an example, if a locally stored ATSSS rule table 1 of Terminal 1 is (APP 1, Smallest delay; APP 2, Smallest delay) and a data steering mode of APP 1 in an ATSSS rule delivered by Terminal 1 that is parsed from the UEAppCongurationUpdate information is Load balancing, the two are inconsistent, and the http request message carrying the UEAppCongurationUpdate information is transmitted to the Session Management Function (SMF).

After receiving the http request message, the SMF parses the http request message and updates the ATSSS rule. After completing the update, the SMF notifies the UACF network element, sends an update success message, that is, a 200 OK message, to the UACF network element, and sends an N4 Session modification Request message to a User Plane Function (UPF) in accordance with a 3GPP protocol standard process, such that the UPF can perform downlink data transmission according to the updated ATSSS rule.

In a step of 203, if an ATSSS rule update message from the Session Management Function is received, an ATSSS rule table update success message is sent to the terminal.

In an example, after receiving the 200 OK message from the SMF, the UACF network element forwards the 200 OK message to inform a User Equipment (UE) that the network side has updated the ATSSS rule set by the user, and sends the 200 OK message to the terminal device, that is, sends the ATSSS rule table update success message to the terminal.

The 200 OK message received by the UE from the UACF prompts the user that the setting is successful.

After the above steps are completed, the network side and the terminal transmit data based on subsequent relevant rules according to the latest ATSSS rule table and through the standard protocol process.

The UE transfers a requirement of the user for an APP to the network side, and the network side schedules uplink and downlink data according to the latest rule to meet the requirement of the user.

It is to be noted that the UACF network element, the UPF network element, and the SMF network element in this embodiment are all functional entities, which may be distributed on a same device on the network side or distributed on different devices on the network side.

Figure 3:
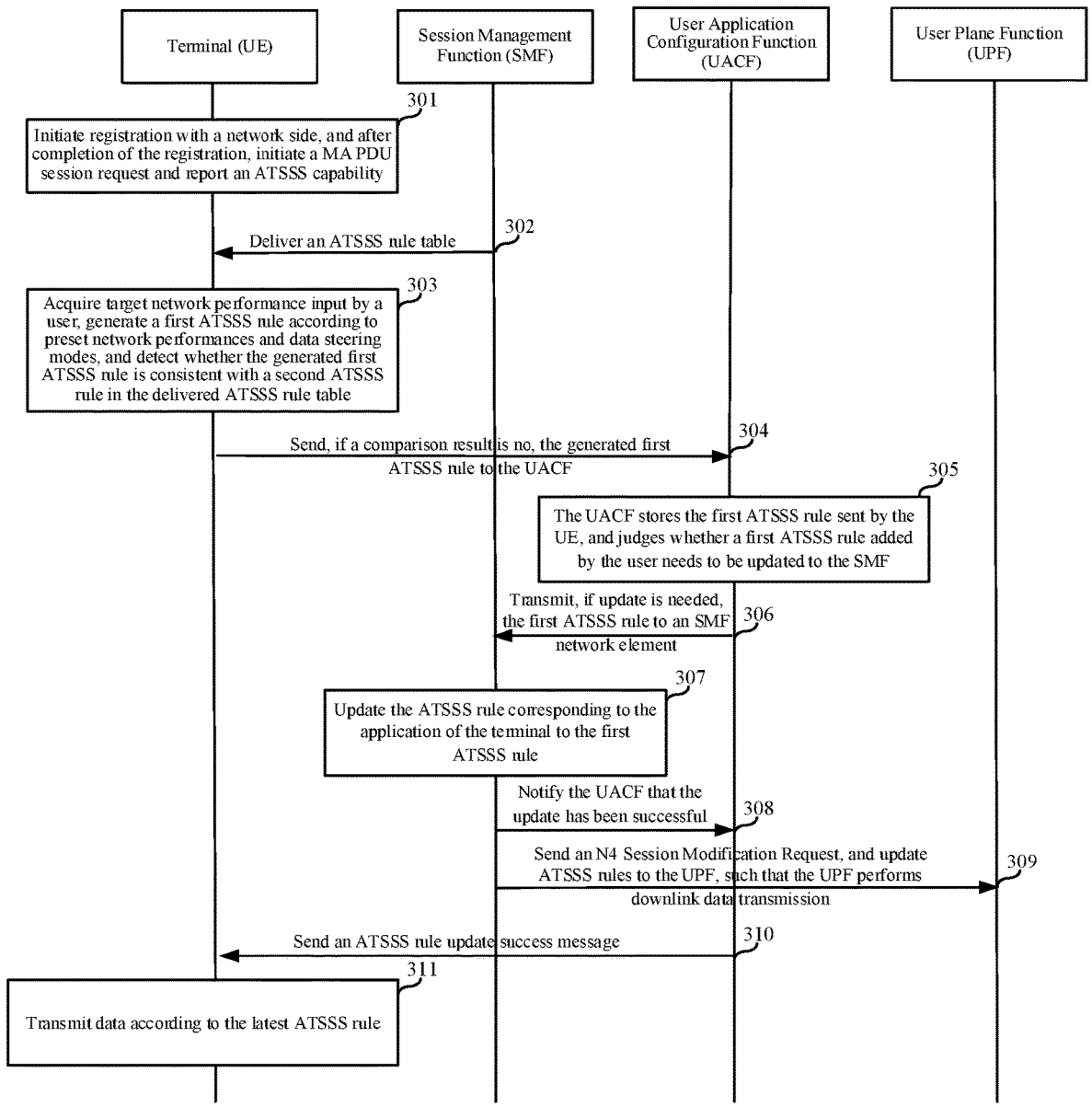
FIG. 3 is a flowchart of interaction between a terminal and a network side according to an embodiment of the present disclosure.

Referring to FIG. 3, a process of interaction between the terminal and the device on the network side is described below in conjunction with an application scenario.

In a step of 301, a terminal initiates registration with a network side, and after completion of the registration, initiates a MA PDU session request and reports an ATSSS capability to the network side.

In a step of 302, an SMF network element sends an ATSSS rule table to the terminal.

In a step of 303, the terminal acquires target network performance input by a user, generates a first ATSSS rule according to preset network performances and data steering modes, and detects whether the generated first ATSSS rule is consistent with a second ATSSS rule in the delivered ATSSS rule table. Both the first ATSSS rule and the second ATSSS rule indicate a data steering mode of a same application.

In an example, the user sets target network performance for each application through a human-computer interaction interface, and maps the target network performance of the APP set by the user to the first ATSSS rule. The first ATSSS rule is compared with the second ATSSS rule in the ATSSS rule table delivered by the network. The network delivers an ATSSS rule 1: APP 1, Load balancing; APP 2, Active-standby, while the user sets ATSSS rule 1: APP 1, Smallest delay; ATSSS rule 2: APP 2, Active-standby. The first ATSSS rule of APP 1 set by the user is inconsistent with the second TSSS rule delivered by the network, while the second ATSSS rule of APP 2 is consistent with the second TSSS rule of APP 2 delivered by the network side.

In a step of 304, if a comparison result is no, the terminal sends the generated first ATSSS rule to a UACF.

In an example, the terminal encapsulates the first ATSSS rule, i.e., the above ATSSS rule 1: APP 1, Smallest delay, into the UEAppCongurationUpdate information and sends the UEAppCongurationUpdate information to the UACF through an http request message. The sending through the HTTP reduces occurrence of signaling storms.

In a step of 305, the UACF stores the first ATSSS rule sent by the UE, and judges whether a first ATSSS rule added by the user needs to be updated to the SMF.

In an example, it is monitored whether the http request message includes UEAppCongurationUpdate information, and if yes, an ATSSS rule in the UEAppCongurationUpdate information is parsed. The UACF network element compares a locally stored ATSSS rule indicating the same terminal and application as the first ATSSS rule with the first ATSSS rule. For example, the first ATSSS rule is an ATSSS rule of APP 1 of Terminal 1, and a locally stored ATSSS rule corresponding to APP 1 of Terminal 1 is compared with the first ATSSS rule.

In a step of 306, if update is needed, the UACF network element transmits the first ATSSS rule to the SMF network element.

In an example, if a comparison result indicates that the ATSSS rules are different, the UACF sends the http request message including the above UEAppCongurationUpdate information to the SMF.

In a step of 307, the ATSSS rule corresponding to the application of the terminal is updated to the first ATSSS rule.

In an example, the SMF network element updates the locally stored ATSSS rule corresponding to APP 1 of Terminal 1 to the first ATSSS rule.

In a step of 308, the SMF network element notifies the UACF that the update is successful.

In an example, the SMF network element returns http 200 OK to the UACF, indicating that the SMF has completed the update successfully.

In a step of 309, the SMF network element sends an N4 Session Modification Request to the UPF network element, and updates ATSSS rules to the UPF, such that the UPF performs downlink data transmission. In this step, the SMF network element may perform data transmission according to the 3GPP protocol standard process.

In a step of 310, the UACF network element sends an ATSSS rule update success message to the terminal.

In an example, after receiving a 200 OK message from the SMF, the UACF forwards the 200 OK message to notify the terminal that the network side has updated the ATSSS rule to the ATSSS rule set by the user.

In a step of 311, data is transmitted according to the latest ATSSS rule.

In an example, the 200 OK message received by the UE from the UACF prompts the user that the setting is successful.

After the above steps, the terminal and the network side can transmit the data based on subsequent relevant rules according to the latest ATSSS rule, such as an ATSSS rule (UE 1: ATSSS rule 1 (APP 1, Smallest delay), and through the standard protocol process.

In this embodiment, the user can personally customize his/her own service requirement, such that each APP can operate under a network channel which satisfies a network performance requirement. Moreover, ATSSS-based user rules and the network interwork, which can effectively prevent packet losses and packet errors caused by inconsistency between the user rules and network rules. In addition, in the embodiments of the present disclosure, user-plane interaction is adopted during the interaction between the terminal and the network, which prevents air interface signaling storms due to a control plane.

The steps of the above methods are divided merely for clarity of description, and can be combined into one step or some steps can be split into multiple steps, any step in which a same logical relationship is included shall fall within the protection scope of the present disclosure. An algorithm or process with any minor modifications or insignificant designs, which do not change core designs of the algorithm and process, shall fall within the protection scope of the present disclosure.

Figure 4:
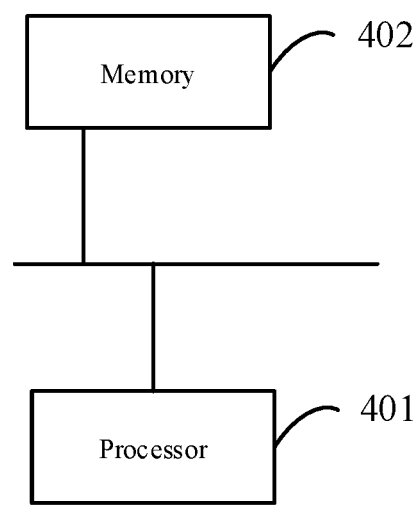
FIG. 4 is a schematic diagram of a network device according to an embodiment of the present disclosure.

Another embodiment of the present disclosure provides a network device, which, as shown in FIG. 4, includes: at least one processor 401; and a memory 402 in communication connection with the at least one processor 401. The memory stores an instruction executable by the at least one processor which, when executed by the at least one processor, causes the at least one processor to implement the above network access method.

The memory and the processor are connected by a bus. The bus may include any number of interconnected buses and bridges, and the bus connects various circuits of one or more processors and the memory together. The bus can also connect various other circuits, such as peripheral devices, voltage regulators, power management circuits, and the like, all of which are well known in the art, and will not be further described herein. A bus interface provides an interface between the bus and a transceiver. The transceiver may be one element or a plurality of elements, such as a plurality of receivers and transmitters, providing a unit for communicating with various other apparatuses over a transmission medium. Data processed by the processor is transmitted over a wireless medium through an antenna. Furthermore, the antenna also receives the data and transmits the data to the processor.

The processor is responsible for bus management and general processing, and can also provide a variety of functions including timing, peripheral interface, voltage regulation, power management, and other control functions. The memory may be configured to store data used by the processor during operation.

Another embodiment of the present disclosure provides a computer-readable storage medium, storing a computer program which, when executed by a processor, causes the processor to implement the above method embodiment.

That is, it shall be appreciated by those having ordinary skills in the art that all or some of the steps in the methods in the above embodiments can be implemented by instructing related hardware through a program. The program is stored in a storage medium and includes several instructions to cause a device (such as a single-chip microcomputer, a chip, or the like) or a processor to implement all or some of the steps of the methods in various embodiments of the present disclosure. The foregoing storage medium includes various media that can store program code such as a USB flash disk, a mobile hard disk, a Read-Only Memory (ROM), a Random Access Memory (RAM), a magnetic disk, and an optical disk.

In the network access method provided in the embodiments of the present disclosure, the terminal can acquire a requirement of an application for network performance, that is, target network performance. When the data steering mode in the ATSSS rule delivered by the network side does not match the requirement for the target network performance, a data steering mode corresponding to the requirement for network performance is transmitted to the network side. The device on the network side updates the ATSSS rule according to a target data steering mode, and the network side can schedule uplink and downlink data according to the latest ATSSS rule, such that the application is connected to a channel which satisfies the requirement for network performance. In addition, compared with the related technology in which the terminal sets a type of an access network and the network side cannot know the settings of the terminal, in this embodiment, the network side interworks with the terminal for the target network performance set by the terminal, thereby preventing losses and confusion of data packets caused by inconsistency between the preset ATSSS rules on the network side and the user's local settings.

It may be understood by those having ordinary skill in the art that the above embodiments are embodiments for implementing the present disclosure, and that various changes can be made to the above embodiments in form and detail in practical application without departing from the protection scope of the present disclosure.

The invention claimed is:

1. A network access method, applied to a terminal device, comprising:
   acquiring target network performance of an application;
   detecting whether the target network performance of the application matches a data steering mode included in an Access Traffic Steering, Switching and Splitting (ATSSS) rule delivered by a network side;
   in response to not matching, transmitting a target data steering mode corresponding to the target network performance to the network side, for a device on the network side to update the ATSSS rule according to the target data steering mode; and
   connecting, in response to receiving an ATSSS rule update success message sent by the device on the network side, the application to a network channel which satisfies the target network performance, wherein the network channel comprises a 3GPP data transmission channel and/or a non-3GPP data transmission channel.

2. The network access method of claim 1, wherein before the detecting whether the target network performance of the application matches a data steering mode included in an ATSSS rule delivered by a network side, the method further comprises:
   generating an ATSSS rule based on a preset mapping rule of network performances and data steering modes; wherein the generated ATSSS rule comprises the target data steering mode;
   wherein the detecting whether the target network performance of the application matches a data steering mode included in an ATSSS rule delivered by a network side comprises:
      detecting whether the generated ATSSS rule is the same as the ATSSS rule delivered by the network side; and
   wherein the transmitting a target data steering mode corresponding to the target network performance to the network side comprises:
      transmitting the generated ATSSS rule to the network side.

3. The network access method of claim 1, wherein the acquiring target network performance of an application comprises:
   providing a human-computer interaction interface; and
   acquiring, through the human-computer interaction interface, the target network performance of the application input by a user.

4. The network access method of claim 1, wherein the transmitting a target data steering mode corresponding to the target network performance to the network side comprises:
   transmitting, through a user plane protocol, the target data steering mode corresponding to the target network performance to the network side.

5. A network access method, applied to a device on a network side, comprising:
   receiving a target data steering mode sent by a terminal device;
   sending, in response to receiving the target data steering mode sent by the terminal device, an Access Traffic Steering, Switching and Splitting (ATSSS) rule update success message to the terminal device after update of an ATSSS rule is completed, for the terminal device to connect the application to a network channel which satisfies target network performance;
   wherein the target data steering mode is a data steering mode corresponding to the target network performance of the application, the update of the ATSSS rule is based on the target data steering mode, and the network channel comprises a 3GPP data transmission channel and/or a non3GPP data transmission channel.

6. The network access method of claim 5, wherein the receiving a target data steering mode sent by a terminal device comprises:
   receiving an ATSSS rule sent by the terminal device, wherein the ATSSS rule table comprises the target data steering mode; and
   wherein before the sending an ATSSS rule update success message to the terminal device, the method comprises:
      sending, to a Session Management Function, the ATSSS rule sent by the terminal device, for the Session Management Function to update the ATSSS rule according to the ATSSS rule sent by the terminal device.

7. The network access method of claim 6, before the sending, to a Session Management Function, the ATSSS rule sent by the terminal device, comprising:
   confirming that a locally stored ATSSS rule is inconsistent with the ATSSS rule sent by the terminal device.

8. The network access method of claim 5, wherein the receiving a target data steering mode sent by a terminal device comprises:

receiving, through a user plane protocol, the target data steering mode sent by the terminal device.

9. A network device, comprising:
at least one processor; and
a memory in communication connection with the at least one processor; wherein:
the memory stores an instruction executable by the at least one processor which, when executed by the at least one processor, causes the at least one processor to perform a network access method, the method comprises:
acquiring target network performance of an application;
detecting whether the target network performance of the application matches a data steering mode included in an Access Traffic Steering, Switching and Splitting (ATSSS) rule delivered by a network side;
in response to not matching, transmitting a target data steering mode corresponding to the target network performance to the network side, for a device on the network side to update the ATSSS rule according to the target data steering mode; and
connecting, in response to receiving an ATSSS rule update success message sent by the device on the network side, the application to a network channel which satisfies the target network performance, wherein the network channel comprises a 3GPP data transmission channel and/or a non-3GPP data transmission channel.

10. A non-transitory computer-readable storage medium, storing a computer program which, when executed by a processor, causes the processor to perform the network access method of claim 1.

11. The network access method of claim 2, wherein the transmitting a target data steering mode corresponding to the target network performance to the network side comprises:
transmitting, through a user plane protocol, the target data steering mode corresponding to the target network performance to the network side.

12. The network access method of claim 3, wherein the transmitting a target data steering mode corresponding to the target network performance to the network side comprises:
transmitting, through a user plane protocol, the target data steering mode corresponding to the target network performance to the network side.

13. The network access method of claim 6, wherein the receiving a target data steering mode sent by a terminal device comprises:
receiving, through a user plane protocol, the target data steering mode sent by the terminal device.

14. The network access method of claim 7, wherein the receiving a target data steering mode sent by a terminal device comprises:
receiving, through a user plane protocol, the target data steering mode sent by the terminal device.

15. The network device of claim 9, wherein before the detecting whether the target network performance of the application matches a data steering mode included in an ATSSS rule delivered by a network side, the method further comprises:
generating an ATSSS rule based on a preset mapping rule of network performances and data steering modes; wherein the generated ATSSS rule comprises the target data steering mode;
wherein the detecting whether the target network performance of the application matches a data steering mode included in an ATSSS rule delivered by a network side comprises:
detecting whether the generated ATSSS rule is the same as the ATSSS rule delivered by the network side; and
wherein the transmitting a target data steering mode corresponding to the target network performance to the network side comprises:
transmitting the generated ATSSS rule to the network side.

16. The non-transitory computer-readable storage medium of claim 10, wherein before the detecting whether the target network performance of the application matches a data steering mode included in an ATSSS rule delivered by a network side, the method further comprises:
generating an ATSSS rule based on a preset mapping rule of network performances and data steering modes; wherein the generated ATSSS rule comprises the target data steering mode;
wherein the detecting whether the target network performance of the application matches a data steering mode included in an ATSSS rule delivered by a network side comprises:
detecting whether the generated ATSSS rule is the same as the ATSSS rule delivered by the network side; and
wherein the transmitting a target data steering mode corresponding to the target network performance to the network side comprises:
transmitting the generated ATSSS rule to the network side.

17. A network device, comprising:
at least one processor; and
a memory in communication connection with the at least one processor; wherein:
the memory stores an instruction executable by the at least one processor which, when executed by the at least one processor, causes the at least one processor to perform the network access method of claim 5.

18. The network device of claim 17, wherein the receiving a target data steering mode sent by a terminal device comprises:
receiving an ATSSS rule sent by the terminal device, wherein the ATSSS rule table comprises the target data steering mode; and
wherein before the sending an ATSSS rule update success message to the terminal device, the method comprises:
sending, to a Session Management Function, the ATSSS rule sent by the terminal device, for the Session Management Function to update the ATSSS rule according to the ATSSS rule sent by the terminal device.

19. A non-transitory computer-readable storage medium, storing a computer program which, when executed by a processor, causes the processor to perform the network access method of claim 5.

20. The non-transitory computer-readable storage medium of claim 19, wherein the receiving a target data steering mode sent by a terminal device comprises:
receiving an ATSSS rule sent by the terminal device, wherein the ATSSS rule table comprises the target data steering mode; and
wherein before the sending an ATSSS rule update success message to the terminal device, the method comprises:
sending, to a Session Management Function, the ATSSS rule sent by the terminal device, for the Session Management Function to update the ATSSS rule according to the ATSSS rule sent by the terminal device.

\* \* \* \* \*